(12) United States Patent
Krumböck et al.

(10) Patent No.: US 6,579,001 B2
(45) Date of Patent: Jun. 17, 2003

(54) METHOD FOR THOROUGHLY MIXING A MELT FLOW MADE OF PLASTIC

(75) Inventors: Erwin Krumböck, Ansfelden (AT); Wolfgang Gasselseder, Oberneukirchen (AT)

(73) Assignee: a+g extrusion technology GmbH, Pasching (AT)

( * ) Notice: Subject to any disclaimer, the term of this patent is extended or adjusted under 35 U.S.C. 154(b) by 11 days.

(21) Appl. No.: 09/735,744

(22) Filed: Dec. 13, 2000

(65) Prior Publication Data

US 2002/0126568 A1 Sep. 12, 2002

(30) Foreign Application Priority Data

Dec. 17, 1999 (AT) ................................................ 2127/99

(51) Int. Cl.⁷ ................................ B01F 5/06; B29B 7/74
(52) U.S. Cl. ......................................... 366/91; 366/339
(58) Field of Search ............................... 366/91, 338, 339, 366/340, 80, 337, 336; 425/205, 208, 209; 138/42

(56) References Cited

U.S. PATENT DOCUMENTS

| | | | | |
|---|---|---|---|---|
| 2,595,210 A | * | 4/1952 | Clinefelter | |
| 3,051,452 A | * | 8/1962 | Nobel | 138/42 |
| 3,239,197 A | * | 3/1966 | Tollar | 366/337 |
| 3,416,190 A | * | 12/1968 | Mehnert | |
| 3,667,732 A | * | 6/1972 | Lejeune | 366/340 |
| 3,711,067 A | * | 1/1973 | Kovacs | 366/81 |
| 3,792,839 A | * | 2/1974 | Gidge | |
| 3,857,551 A | * | 12/1974 | Troy | 366/336 |
| 4,003,554 A | * | 1/1977 | Chauffoureaux | |
| 4,050,676 A | * | 9/1977 | Morishima et al. | 366/339 |
| 4,170,446 A | * | 10/1979 | Schutz et al. | 336/337 |
| 4,198,168 A | * | 4/1980 | Penn | 366/336 |
| 4,208,136 A | * | 6/1980 | King | 366/338 |
| 4,249,877 A | * | 2/1981 | Machen | 366/336 |
| 4,363,552 A | * | 12/1982 | Considine | 366/340 |
| 4,466,741 A | * | 8/1984 | Kojima | 366/339 |
| 4,478,516 A | * | 10/1984 | Kessler | 366/340 |
| 4,533,015 A | * | 8/1985 | Kojima | 366/339 |
| 4,614,440 A | * | 9/1986 | King | 366/336 |
| 4,616,937 A | * | 10/1986 | King | 366/336 |
| 4,747,697 A | * | 5/1988 | Kojima | 366/339 |
| 4,848,920 A | | 7/1989 | Heathe et al. | 366/339 |
| 4,874,249 A | * | 10/1989 | Kabatek et al. | 366/339 |
| 5,104,233 A | * | 4/1992 | Kojima | 366/339 |
| 5,478,150 A | * | 12/1995 | Keller et al. | |
| 5,486,049 A | * | 1/1996 | Boatman et al. | 366/340 |
| 5,564,827 A | * | 10/1996 | Signer | 366/336 |
| 5,776,534 A | * | 7/1998 | Christensen et al. | |
| 5,919,509 A | * | 7/1999 | Cremers et al. | |

FOREIGN PATENT DOCUMENTS

| | | | |
|---|---|---|---|
| DE | 1901013 | * | 7/1970 |
| DE | 1 959 348 | | 6/1971 |
| DE | 2352480 | * | 4/1975 |
| DE | 24 61 340 | | 7/1976 |

* cited by examiner

Primary Examiner—Tony G. Soohoo
(74) Attorney, Agent, or Firm—Collard & Roe, P.C.

(57) ABSTRACT

In order to enable the thorough mixture of a melt flow S made of plastic, and polyvinyl chloride in particular, with the lowest possible amount of damage and the adequate homogenization thereof, the melt flow S is divided into partial flows T, which partial flows T are twisted independently from one another about axes extending in the direction of flow and are thereafter joined again into a common melt flow S.

1 Claim, 3 Drawing Sheets

METHOD FOR THOROUGHLY MIXING A MELT FLOW MADE OF PLASTIC

FIELD OF THE INVENTION

The invention relates to a method for thoroughly mixing a melt flow made of plastic, and polyvinyl chloride (PVC) in particular, and to a mixer to perform said method with a mixing body which can be integrated in the flow channel.

DESCRIPTION OF THE PRIOR ART

In order to increase the homogeneity of the obtained melt during extrusion processes and thus to improve the quality of the extruded product, it is known to thoroughly mix the melt on its way between the extruder and the extrusion die, with static mixers mostly being used, i.e. mixers with static mixing devices whose mixing effect occurs merely as a result of the cross-flow of the melt. If the plastic melts are thermally sufficiently stable at the processing temperature in the extrusion or injection molding process, the usual mixing methods can be used in which individual quantities of the melt can remain considerably longer in the mixer than the average melt dwell time without being damaged. A number of plastic melts, which also includes PVC melts in particular, are very temperature sensitive, so that damage will occur during the mixing process at different dwell times of parts of the melt. Since all known mixers comprise zones which cause long dwell times for individual quantities such as edges of the mixer which extend transversally to the main direction of flow, it may occur that the plastic settles in said zones, thus causing thermal damage to the sensitive melt already after a short period of time.

PVC is used for the production of profiles mainly in the extrusion process with double screw extruders, thus obtaining an average mass temperature of approx. 190 to 200° C., which mass temperature, under the usual operating conditions, shows local differences in temperature of approx. 10 to 20° C. over the cross section of the flow. Since the PVC melt flows laminarly in the processing zone of the extrusion dies, temperature compensation is only possible by way of the interior thermal conduction. There is insufficient time for this, however, so that a PVC melt flows through the dies in which considerable local differences in temperature occur. The flow speed of the melt in the die zone depends further on the geometry of the flow channel, the die pressure and the rheological properties of the melt, which rheological properties are substantially determined by the temperature, leading to the consequence that the wall thickness of the extruded profile show considerable differences, even though an even wall thickness would be ensured as a result of the local geometry of the flow channel. This is caused by the local temperature of the mass, because there is a higher flow speed at a higher temperature of the mass and thus a higher wall thickness of the profile despite the same geometry (gap width) of the flow channel than at a lower temperature of the mass. Since the profiles for windows or the like require narrow tolerances, considerable efforts were required up until now in order to compensate for the deviations in the wall thickness as a result of temperature differences by changing the gap widths in the extrusion dies. An additional difficulty is that one and the same extrusion die will lead to different wall thickness on different extruders and that as a result it is necessary to always perform an adaptation of the dies to the extruder used at the time. Any application of the same extrusion dies in different extruders will thus automatically lead to quality impairments.

SUMMARY OF THE INVENTION

The invention is based on the object of providing a method of the kind mentioned above which allows an adequate and, in particular, damage-free thorough mixture also of temperature-sensitive plastic melts and compensates for the differences in temperature in melt flows coming from the extruder, so that the extrusion die can be provided with a homogeneous melt. The prerequisite is thus given to substantially reduce deviations in the wall thickness in new extrusion dies and to considerably reduce the configuration efforts for the dies, as well as to reduce the sensitivity towards different extruders and to even make the same frequently negligible in practical operation, thus enabling the application of dies even on different extrusion lines, which simplifies logistics and enables the optimization of the capacity utilization capabilities of the extrusion lines. Furthermore, a mixer is to be provided which allows a simple and appropriate performance of the method.

This object is achieved by the invention in such a way that the melt flow is divided into partial flows, which partial flows are twisted independent from one another about axes which extend in the direction of flow and are thereafter joined again into a common melt flow. As a result of the division of the melt flow into individual partial flows which are inherently turned and thereafter joined again, zones of the melt will come into contact with one another after the thorough mixture which were spaced from one another prior to the mixture. As a result of the now close contact and short distances, any existing differences in temperature can level out relatively quickly. Stagnation zones are prevented in this process and a mixing effect is obtained particularly in the radial direction, thus avoiding any danger of damage to any thermally unstable melts by longer dwell times of individual masses and thus preparing a substantially evenly tempered, homogeneous melt flow.

Particularly favorable mixing effects can be achieved when the partial flows are twisted about a rotational angle$_\alpha$ which lies between approx. 90° and 180°, with the direction of rotation being alternatingly either in the same or opposite direction, and when the melt flow is divided into four to twelve partial flows. As a result of the chosen number of partial flows there are sufficient contact zones and the spatial changes to the parts of the melt occur over respectively wide distances. Moreover, the partial cross sections remain large enough to keep the need for pressure low during the cross-flow, so that it is also possible to perform the thorough mixture in two or more successive steps. It is understood that this mixing process can also be combined with other known methods in order to homogenize the reunited melt flow over the flow cross section and to wipe out the traces of the partial flows, for which purpose a mixing effect in the circumferential direction is particularly important.

In order to perform the mixing process a mixer with a mixing body which can be integrated in the flow channel is proposed, with the mixing body comprising mixing channels with a twisting device, which channels extend from an inlet to an outlet. Said mixer allows with its mixing channels the perfect division of the melt flow into a respective number of partial flows and the twisting device ensures the desired twisting of the partial flows within the mixing channels, thus conveying melt particles from the central zone outwardly and outer particles in the opposite direction into the central zone, thus producing the desired radial mixing effect.

If the mixing channels comprise substantially circular cross sections and are provided with at least one groove and/or rib extending along a helical line on the jacket surface as a twisting device, a screwing movement of the partial flows occurs while flowing through the mixing channels and thus the desired mixing effect is obtained.

It is particularly advantageous, however, when the mixing channels are provided as twisting devices with substantially polygonal cross sections which twist in the longitudinal direction of the channel, so that the course and the cross-sectional shape of the mixing channels per se ensure the twisting of the partial streams. The cross-sectional shapes provided for the mixing channels only play a subordinate role. For reasons of manufacture a triangular cross section is recommended which can easily be fitted into the circular or even polygonal cross section of the inlet and outlet. It is understood that other cross-sectional shapes can be used as initial cross sections such as square, pentagonal or hexagonal cross sections or the like.

Appropriately, the inlet and outlet are subdivided by radial walls into several inlet and outlet openings, which inlet and outlet openings assigned in pairs to one another are mutually connected by the mixing channels. The inlet and outlet openings are only delimited by the inlet and outlet edges and are situated next to one another, so that the division or unification of the melt flow in the inlet and outlet zone can occur without any congestion or stagnation zones.

If the inside jacket surface of the mixing channels consists of straight generatrices which extend inclined to the straight channel axis and connect the inlet and outlet contours of the associated inlet and outlet openings, a mixer is obtained which can be produced in a rational way with the help of wire-EDM.

The mixing channels with the substantially polygonal cross sections which twist in the longitudinal direction of the channel can be flowed through by the partial streams without any major need for pressure, so that for increasing the mixing effect it is also possible to successively position two or several mixing bodies which are angularly offset about the direction of flow. Experiments with four successively disposed mixing bodies having shown very favorable mixing results. The angular offset of the mixing bodies ensures a respective enhancement of the mixing effect and prevents any mere increase of the twisting angle of the partial flows.

Such a mixer can also ideally be combined with conventional mixers in order to level out the unification of the partial flows into the melt flow by mixing in the circumferential direction.

BRIEF DESCRIPTION OF THE DRAWING

The subject matter of the invention is explained in a purely schematical manner in the drawing, wherein.

DESCRIPTION OF THE PREFERRED EMBODIMENTS

Figure 1:
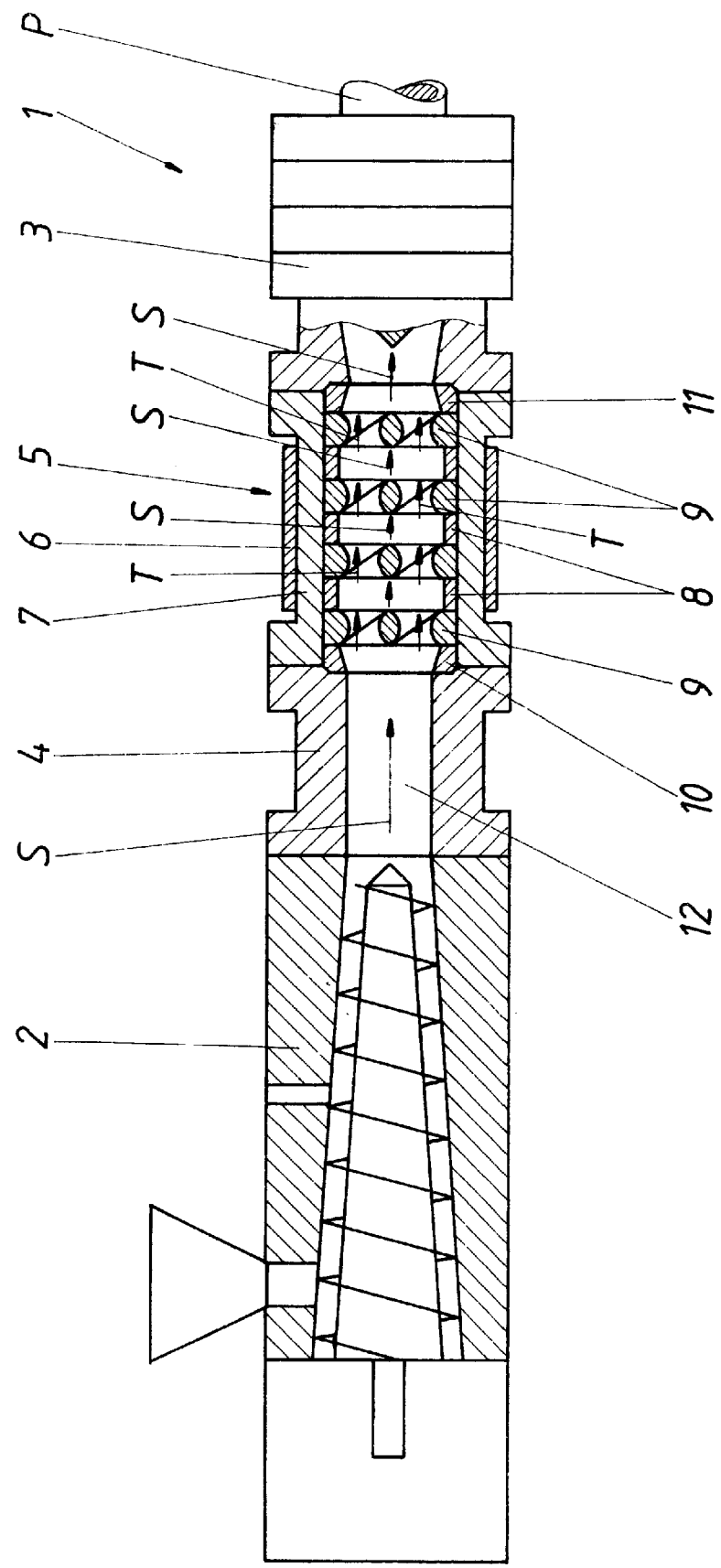
FIG. 1 shows an extrusion plant with mixers in accordance with the invention in a partially sectional side view.
Figure 2:
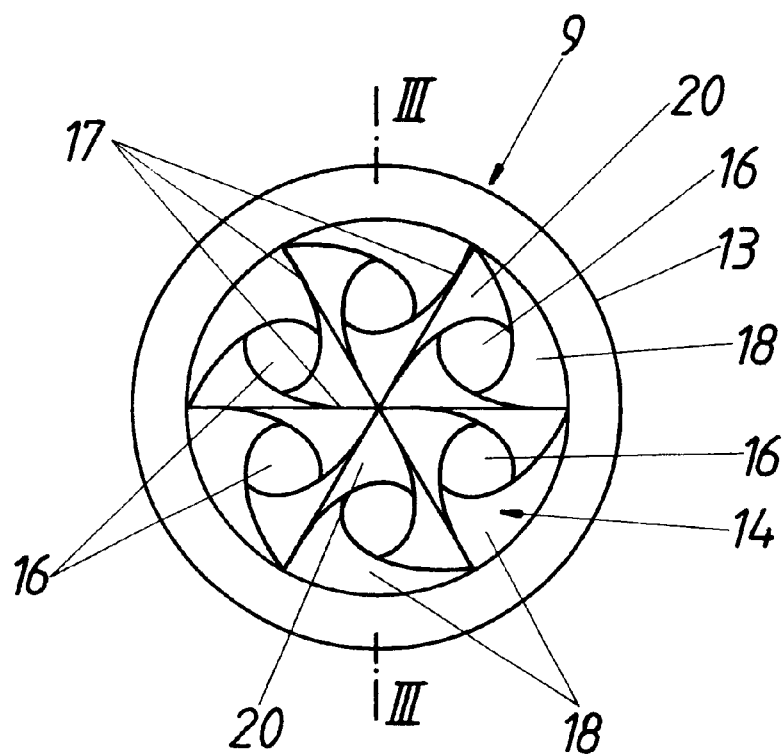
FIGS. 2 and 3 show a mixer in accordance with the invention in a face view and in an axial sectional view along line III—III of FIG. 2.
Figure 3:
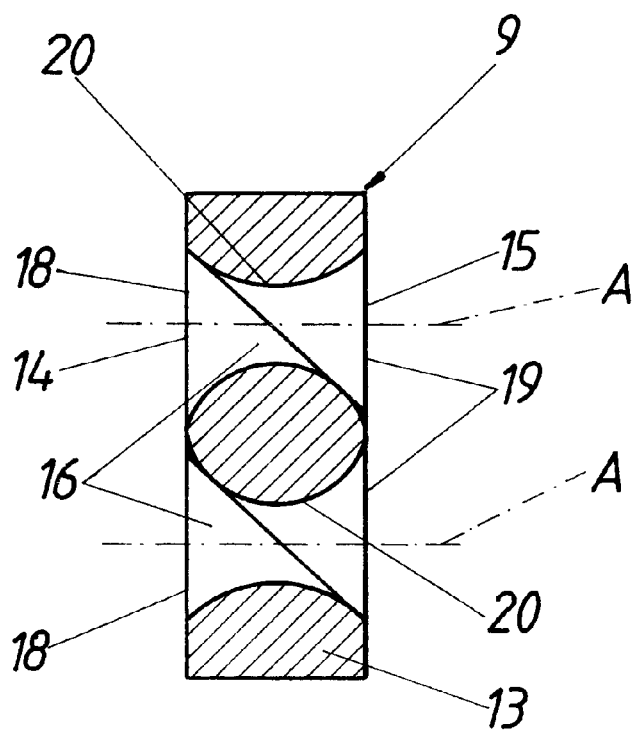
Figure 4:
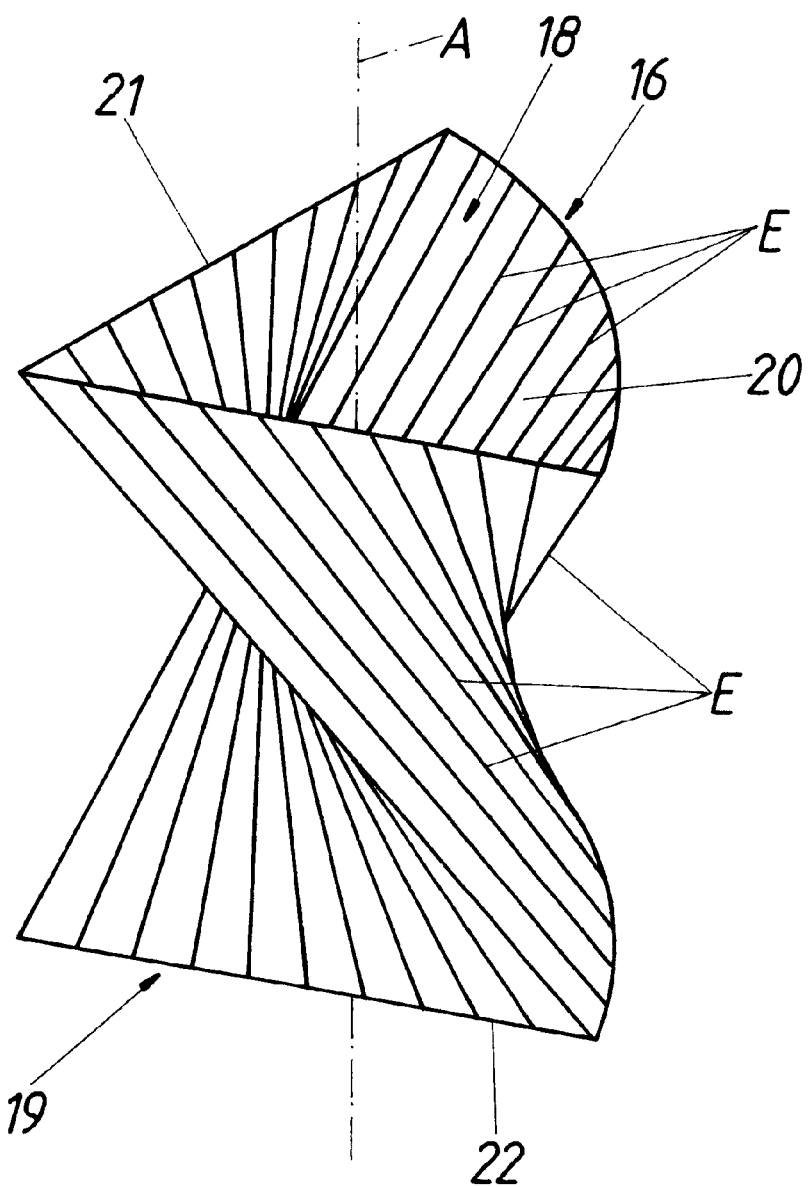
FIG. 4 shows a mixing channel of a mixer in form of a wire model in a graphical representation.

An extrusion plant 1, which is exhibited only in part, for the production of profiles P from polyvinyl chloride (PVC) comprises an extruder 2 and an extrusion die 3, with a mixing apparatus 5 for the thorough mixing of the melt flow S made of PVC being arranged between the extrusion die 3 and an adapter 4 connected to the extruder 2. The mixing apparatus 5 comprises a housing 7 which is heatable by way of a heating device 6, in which housing are disposed successively behind one another four mixers 9 by interposing spacer rings 8, which mixers can be integrated in the flow channel 12 for the melt flow S via an inlet element 10 and an outlet element 11.

The mixers 9 each consist of a disk-like mixing body 13 which forms mixing channels as a twisting device which extend axially from an inlet 14 to an outlet 15 and comprise a substantially triangular cross section twisting in the direction of the channel axis A. Inlet 14 and outlet 15 are subdivided by radial walls 17 into several inlet and outlet openings 18, 19 which are each in mutual paired connection by the mixing channels 16. The inside jacket surface 20 of the mixing channels is obtained from the straight generatrices E which extend obliquely to the straight channel axis A and connect the inlet and outlet contours 21, 22 of the associated inlet and outlet openings 18, 19.

The melt flow S is divided by mixer 9 into six partial flows T, which partial flows T twist themselves as a result of the axially twisting cross sections of the mixing channels and are then joined again into a common melt flow S. This leads to a radial mixing effect without stagnation zones which leads to a homogenization of the melt flow and substantially levels out the local differences in the mass temperature, so that the extrusion die 3 is provided with a substantially evenly tempered melt.

What is claimed is:

1. A mixer for thoroughly mixing a plastic melt flowing through a flow channel in a longitudinal direction, which comprises at least one mixing body arranged in the flow channel, the mixing body comprising mixing channels having a polygonal cross section twisting in the longitudinal direction and extending from an inlet for the flowing plastic melt to an outlet therefor, the inlet and the outlet having contours and being subdivided by radial walls into several inlet and outlet openings, pairs of the inlet and outlet openings being connected by the mixing channels, and an inside jacked surface of the mixing channels being defined by straight generatrices extending obliquely to the longitudinal axis of the channels and connecting the contours of the inlet and outlet openings.

* * * * *